US009954842B2

United States Patent
Huang

(10) Patent No.: US 9,954,842 B2
(45) Date of Patent: *Apr. 24, 2018

(54) METHOD, CLIENT, SERVER AND SYSTEM OF LOGIN VERIFICATION

(71) Applicant: Alibaba Group Holding Limited, Grand Cayman (KY)

(72) Inventor: Mian Huang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,306

(22) Filed: Nov. 15, 2016

(65) Prior Publication Data

US 2017/0063830 A1 Mar. 2, 2017

Related U.S. Application Data

(63) Continuation of application No. 13/944,763, filed on Jul. 17, 2013, now Pat. No. 9,537,843.

(30) Foreign Application Priority Data

Jul. 19, 2012 (CN) .......................... 2012 1 0251542

(51) Int. Cl.
*H04L 29/06* (2006.01)
(52) U.S. Cl.
CPC .............. *H04L 63/08* (2013.01); *H04L 63/10* (2013.01); *H04L 67/42* (2013.01)
(58) Field of Classification Search
CPC .......... H04L 63/08; H04L 63/10; H04L 67/42
See application file for complete search history.

(56) References Cited

U.S. PATENT DOCUMENTS

| 8,352,551 | B2* | 1/2013 | Campbell | ............ | G06Q 10/107 709/206 |
| 8,826,402 | B2* | 9/2014 | Mo | ....................... | H04L 12/581 455/415 |

(Continued)

FOREIGN PATENT DOCUMENTS

| CN | 102158465 | 8/2011 |
| JP | 2005321928 | 11/2005 |

OTHER PUBLICATIONS

Stihler, Maicon, et al. "Integral federated identity management for cloud computing." New Technologies, Mobility and Security (NTMS), 2012 5th International Conference on. IEEE, 2012.*

(Continued)

*Primary Examiner* — Chau Le
(74) *Attorney, Agent, or Firm* — Lee & Hayes, PLLC

(57) ABSTRACT

The present disclosure introduces a method, a client, a server and a system of login verification. When a user logins, the client obtains a login request from the user for logging into an under-protected account system, where the login request includes at least an account to be logged in, determines property information of a current related account system corresponding to the account to be logged in from property information stored in a current login host, generates login verification information including at least the property information of the current related account system, and sends the login verification information to a server. The server verifies a login activity of the user based on the pre-stored reliable property information corresponding to the account to be logged in. Thus, the login verification process is simplified and the efficiency of login verification using the server is enhanced.

20 Claims, 14 Drawing Sheets

(56) References Cited

U.S. PATENT DOCUMENTS

| | | | |
|---|---|---|---|
| 8,904,506 | B1 | 12/2014 | Canavor et al. |
| 9,065,817 | B2* | 6/2015 | Bailey .................... G06F 21/41 |
| 2002/0059531 | A1 | 5/2002 | Lai On |
| 2003/0051171 | A1* | 3/2003 | Pearson ................ G06Q 30/02 |
| | | | 726/4 |
| 2003/0070069 | A1 | 4/2003 | Belapurkar et al. |
| 2006/0080526 | A1 | 4/2006 | Kasahara et al. |
| 2006/0090073 | A1 | 4/2006 | Steinberg et al. |
| 2006/0129832 | A1 | 6/2006 | Abedi et al. |
| 2006/0156389 | A1* | 7/2006 | Brown .................. G06F 21/552 |
| | | | 726/5 |
| 2007/0056024 | A1 | 3/2007 | Hsu et al. |
| 2007/0240202 | A1 | 10/2007 | Sullivan et al. |
| 2008/0114980 | A1 | 5/2008 | Sridhar |
| 2008/0155651 | A1 | 6/2008 | Wasmund |
| 2009/0140040 | A1 | 6/2009 | Wang et al. |
| 2010/0131408 | A1 | 5/2010 | Perlman et al. |
| 2010/0229230 | A1 | 9/2010 | Edeki et al. |
| 2010/0293605 | A1 | 11/2010 | Longobardi |
| 2011/0239278 | A1* | 9/2011 | Downey ............... H04L 63/083 |
| | | | 726/4 |
| 2012/0042364 | A1 | 2/2012 | Hebert |
| 2012/0198544 | A1 | 8/2012 | McKeeth |
| 2012/0209735 | A1* | 8/2012 | Subramanian .......... H04L 9/321 |
| | | | 705/26.1 |
| 2012/0271691 | A1 | 10/2012 | Hammad et al. |
| 2013/0036458 | A1* | 2/2013 | Liberman ............ H04L 9/3231 |
| | | | 726/6 |
| 2013/0124229 | A1 | 5/2013 | Cashman et al. |
| 2013/0125211 | A1* | 5/2013 | Cashman ................ H04L 63/08 |
| | | | 726/4 |
| 2015/0242619 | A1* | 8/2015 | Bender ................ G06F 21/577 |
| | | | 726/22 |
| 2015/0324579 | A1* | 11/2015 | Qian ....................... H04L 63/10 |
| | | | 726/6 |
| 2016/0321745 | A1* | 11/2016 | Zhang .................... H04L 63/10 |

OTHER PUBLICATIONS

Ghazizadeh, Eghbal, et al. "A trust based model for federated identity architecture to mitigate identity theft." Internet Technology and Secured Transactions, 2012 International Conference for. IEEE, 2012.*

Celesti, Antonio, et al. "Three-phase cross-cloud federation model: The cloud sso authentication." Advances in Future Internet (AFIN), 2010 second international conference on. IEEE, 2010.*

De Clercq, J., "Single Sign-On Architectures", InfraSec, Springer-Verlag Berlin Heidelberg, 2002, 19 Pages.

Office Action for U.S. Appl. No. 13/944,763, dated Nov. 20, 2014, Mian Huang, "Method, Client, Server and System of Login Verification", 34 pages.

Office action for U.S. Appl. No. 13/944,763, dated Dec. 17, 2015, Huang, "Method, Client, Server and System of Login Verification", 38 pages.

Final Office Action for U.S. Appl. No. 13/944,763, dated Apr. 7, 2015, Mian Huang, "Method, Client, Server and System of Login Verification", 34 pages.

Office action for U.S. Appl. No. 13/944,763, dated May 17, 2016, Huang, "Method, Client, Server and System of Login Verification", 36 pages.

* cited by examiner

| Segment | Description |
|---|---|
| 0 | 0x02 start message |
| 1-2 | Version number, e.g., 2007B3 being 0x1051 |
| 3-4 | Instruction |
| 5-6 | Serial number |
| 7-10 | QQ number |
| 11-N | Data segment |
| N+1 | 0x03 end indicator |

FIG. 1

METHOD, CLIENT, SERVER AND SYSTEM OF LOGIN VERIFICATION

CROSS REFERENCE TO RELATED PATENT APPLICATIONS

This application is a continuation of U.S. patent application Ser. No. 13/944,763 filed on Jul. 17, 2013, entitled "Method, Client, Server and System of Login Verification", which claims foreign priority to Chinese Patent Application No. 201210251542.7 filed on Jul. 19, 2012, entitled "Method, Client, Server and System of Login Verification", which is hereby incorporated by reference in its entirety.

TECHNICAL FIELD

The present disclosure relates to the field of Internet technology, and particularly, relates to methods, clients, servers and systems of login verification.

BACKGROUND

With the development of Internet technology, the lives of people have been mingled with networks. An increasing number of people choose to use networks as tools of communication, entertainment and shopping, such as communicating with others using accounts of QQ (which is an instant messaging tool), MSN, etc., and conducting online shopping through registration on online shops, e.g., Taobao. However, account hacking is very common nowadays. Many QQ and MSN user accounts are hacked and illegitimately logged into by other users using illegal methods such as hacking software, thus affecting normal operations of users, and worse still, causing economic losses to the users. Also, network servers cannot distinguish whether an account of a user is normally logged in or illegitimately logged in, thus greatly reducing the security of networks.

Recently, in order for servers to accurately verify a login of a user and solve the problem of illegitimate logins, a number of service providers have adopted approaches such as digital certificates or binding accounts to hardware. A digital certificate is a series of data which is used to indicate identification information of a communication party in Internet communications, provide a method of verifying an identity of a user in a server through the network, and give an access authority of network resources according to his/her identity. After a user applies for a digital certificate, the user cannot conduct any operation except querying an account if a copy of the digital certificate is not introduced when he/she logs in from another computer. As such, the security of the user's account is enhanced. However, if the user changes his/her computer, he/she needs to re-apply for a digital certificate in order to allow accurate verification by the server.

On the other hand, binding an account to hardware includes a U-shield or a mobile digital certificate. The U-shield is a USB key or drive that includes a built-in microprocessor and employs a specific algorithm for encryption/decryption of online data and digital signing to provide confidentiality, authenticity, integrity and non-repudiation of online transactions. A user first needs to purchase a U-shield and establish an association between an account and the U-shield. When conducting an online transaction, a bank sends the user a string A, which is obtained after encrypting a combination of a time string, an address string, a transaction information string and an anti-reply attack string. The U-shield of the user performs a non-reversible computation on the string A based on the user's individual certificate to get a new string B, and sends the string B to the bank. The bank also conducts the non-reversible computation. If computation results of the bank and the user are identical, the user's login is recognized as legitimate and the transaction can be completed. If the results are not identical, the user's login is recognized as illegitimate and the transaction fails. As such, the network security is guaranteed.

However, as can be seen from the above, both the process of applying a digital certificate and the process of establishing an association between a U-shield and a user account are relatively tedious when verifying a login of a user, thus failing to achieve a highly efficient and accurate verification of whether the login of the user is reliable in a server.

SUMMARY OF THE DISCLOSURE

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The goal of the present disclosure is to provide a login verification method in order to solve the problem of failing to achieve a highly efficient and accurate verification of whether a login associated with a user is reliable in a server under existing technologies.

A method of login verification, which includes:
obtaining a login request from a user for logging into an under-protected account system, where the login request includes at least an account to be logged in;
determining, from property information that is stored in a current login host, property information of a current related account system that corresponds to the account to be logged in;
generating login verification information that includes at least the property information of the current related account system; and
sending the login verification information to a server, where the property information of the current related account system in the verification information is a basis for determining that a login is reliable when the server compares the property information of the current related account system with pre-stored reliable property information that corresponds to the account to be logged in and when an intersection therebetween exists and the intersection satisfies a pre-set criterion.

In one embodiment, the reliable property information is obtained using the following:
obtaining a login request the user has sent for logging into the account to be logged in at the first time;
determining, from property information stored in a host associated with a first login, property information of a first related account system corresponding to the account to be logged in; and
sending the property information of the first related account system to the server, where the property information of the first related account system is a basis on which the server determines the reliable property information corresponding to the account to be logged in.

In some embodiments, the property information includes a pre-set message of a network flow that corresponds to an account system or a pre-set segment of the pre-set message.

In one embodiment, the method further includes: irreversibly processing the property information of the current related account system.

A method of login verification, which includes: receiving login verification information sent from a client, where the login verification information includes at least login verification information of property information of a current related account system that corresponds to an account to be logged in, and where the property information of the current related account system is determined from property information that is stored in a current login host after the client obtains the login request from a user; comparing the property information of the current related account system with pre-stored reliable property information that corresponds to the account to be logged in; and determining that a login is reliable when an intersection exists and the intersection satisfies a pre-set criterion.

In one embodiment, when an intersection does not exist or the intersection does not satisfy the pre-set criterion, the method further includes: verifying whether the current login host is a trusted host, if affirmative, determining that the login is reliable, and if not, determining that the login is unreliable.

Additionally or alternatively, when the login verification information includes a machine property of the current login host, verifying whether the current login host is a trusted host includes: when the machine property of the current login host satisfies a first reliable criterion, determining that the current login host is a trusted host.

Additionally or alternatively, verifying whether the current login host is a trusted host includes: obtaining a historical login record of the current login host; and when the historical login record satisfies a second reliable criterion, determining that the current login host is a trusted host.

Additionally or alternatively, verifying whether the current login host is a trusted host includes: performing a second verification for the current login host; and when the current login host passes the second verification, determining that the current login host is a trusted host.

In one embodiment, the reliable property information is obtained through the following: receiving property information of a first related account system corresponding to the account to be logged in from the client, where the property information of the first related account system is determined from property information stored in a first login host through which the user logs into the account to be logged in for the first time; and determining reliable property information corresponding to the account to be logged in based on the property information of the first related account system.

In some embodiments, after verifying that the current login host is a trusted host and determining that the login is reliable, the method further includes: adding the property information of the current related account system to pre-stored reliable property information that corresponds to the account to be logged in to update the reliable property information that corresponds to the account to be logged in.

The present disclosure further provides a client, a server and a system of login verification for practical implementations and applications of the above methods.

A client of login verification, which includes: a login request acquisition module used for obtaining a login request from a user for logging into an under-protected account system, where the login request includes at least an account to be logged in; a current-related-account-system property information determination module used for determining property information of a current related account system that corresponds to the account to be logged in from property information stored in a current login host; a login verification information generation module used for generating login verification information which includes at least the property information of the current related account system; and a login verification information sending module used for sending the login verification information to a server, where the property information of the current related account system in the login verification information is a basis for determining that the login is reliable when the server compares the property information of the current related account system with pre-stored reliable property information that corresponds to the account to be logged in and when an intersection therebetween exists and the intersection satisfies a pre-set criterion.

A server of login verification, which includes: a login verification information receiving module used for receiving login verification information sent from a client, where the login verification information includes at least login verification information of property information of a current related account system that corresponds to an account to be logged in, and where the property information of the current related account system is determined using property information stored in a current login host after the client obtains a login request from a user; a comparison module used for comparing the property information of the current related account system with pre-stored reliable property information that corresponds to the account to be logged in; and a reliable login determination module used for determining that a login is reliable when an intersection exists and the intersection satisfies pre-set criterion.

A system of login verification includes the client and the server as described above.

Compared with existing technologies, the present disclosure has the following advantages. In the method of login verification disclosed in the embodiments of the present disclosure, when a user logs in, a client obtains a login request from the user for logging into an under-protected account system, determines property information of a current related account system corresponding to an account to be logged in from property information that is stored in a current login host, generates login verification information that includes at least the login request and the property information of the current related account system that is obtained after irreversible processing, and sends the login verification information to a server. The server compares the property information of the current related account system with pre-stored reliable property information that corresponds to the account to be logged in, and determines that a login associated therewith is a reliable login if an intersection exists. In this method, the server verifies a login activity of the user based on pre-stored reliable property information that corresponds to the account to be logged in, without performing additional operations of login verification using a digital certificate or a U-shield, thus simplifying a login verification process and improving the efficiency of login verification using the server.

Furthermore, as the digital certificate or the U-shield is no longer needed, the cost for a user is also reduced.

However, any product implementing the present disclosure does not need to achieve all the above advantages at the same time.

BRIEF DESCRIPTION OF THE DRAWINGS

In order to more clearly understand the technical scheme of the exemplary embodiments of the present disclosure, accompanying figures that are needed for explaining the exemplary embodiments are briefly described below. As should be apparent, the following figures only constitute a few exemplary embodiments of the present disclosure. Based on these accompanying figures, one skilled in the art can obtain other figures without making any creative effort.

FIG. 1 is a schematic diagram of a message that is exchanged between a QQ account system and a server when conducting data exchange in accordance with an embodiment of the present disclosure.

DETAILED DESCRIPTION

Figure 2:
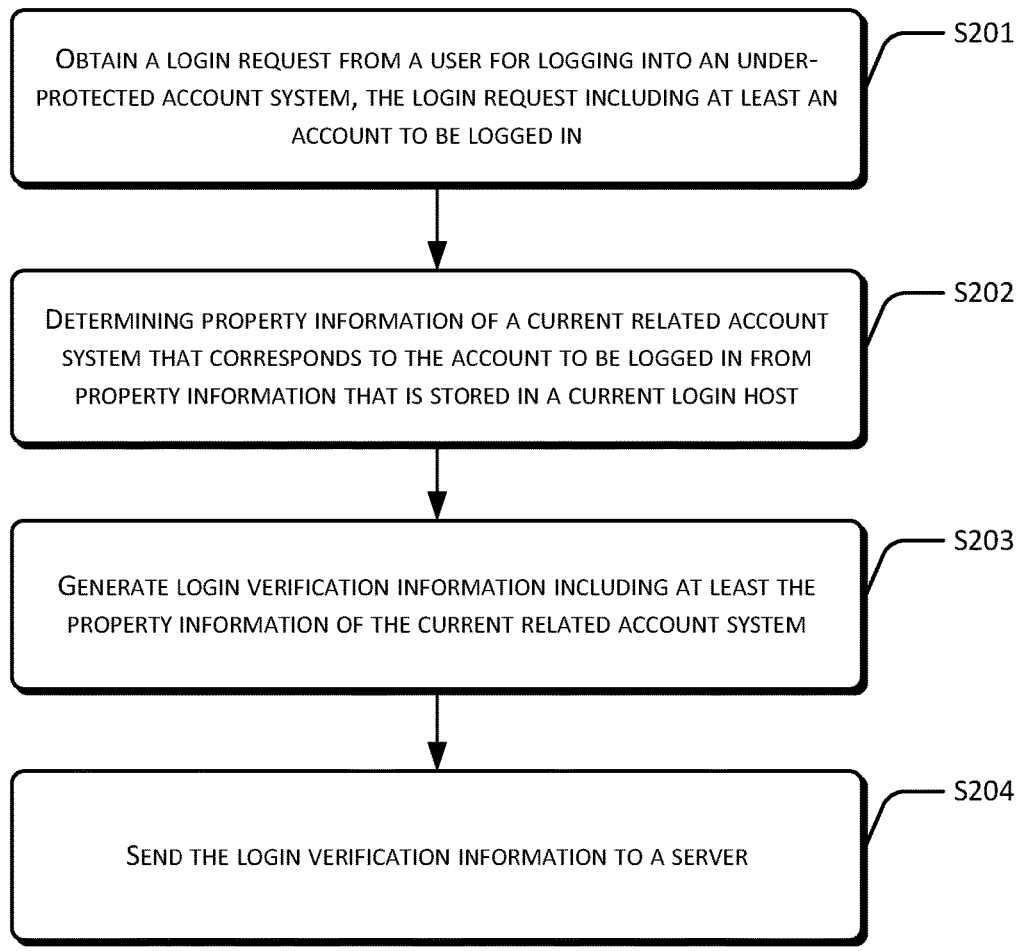
FIG. 2 is a flowchart illustrating a method of login verification in accordance with an embodiment of the present disclosure.

The technical scheme in the exemplary embodiments will be described more clearly and completely using the accompanying figures of the exemplary embodiments. The exemplary embodiments described herein only constitute parts, but not all, of exemplary embodiments of the present disclosure. Based on the exemplary embodiments of the present disclosure, one skilled in the art can obtain all other exemplary embodiments, which are still within the scope of the present disclosure.

The present disclosure can be used in a variety of different general or specific computing system environments or configurations, for example, a personal computer, a server computer, a mobile device or a portable device, a tablet, a multi-processor system, and/or any distributed computing environments that include the above systems or devices, etc.

The present disclosure can be described in the general context of computer-executable instructions, such as program modules. Generally, program modules comprise routines, procedures, objects, components, data structures, etc., for executing specific tasks or implementing specific abstract data types. The present disclosure may also be implemented in distributed computing environments. In these distributed computing environments, remote processing devices which are connected through communication networks are used to perform tasks. In a distributed computing environment, a program module can be in one or more storage medium including local or remote computing storage device(s).

One idea of the present disclosure may include: obtaining, by a client, a login request from the user for logging into an under-protected account system, where the login request includes at least an account to be logged in; determining property information of a current related account system that corresponds to the account to be logged in from property information that is stored in a current login host; generating login verification information that includes at least the login request and the property information of the current related account system that is obtained after irreversible processing; and sending the login verification information to a server, where the property information of the current related account system that is obtained after irreversible processing is a basis on which the server compares to pre-stored reliable property information that corresponds to the account to be logged in, and determines that a login associated therewith is a reliable login if an intersection exists. In some instances, the disclosed method may further be used with other verification methods such as U-shield, for example.

A host where a user logs in usually is installed with a number of account system-based software, such as QQ, MSN, OutLook, Xunlei, or AliPay. These software exchange data with servers and send data messages that include certain property flow information. The present disclosure uses certain data messages having certain flow property information or certain segments of the data messages, which are included in a network flow sent when a user exchanges information with servers through these account systems, as property information corresponding to the account systems. In this embodiment, a type or a designated segment of a data message may be defined in advance based on conditions. Take the QQ account system as an example. FIG. 1 illustrates a message that has many segments and is sent when the QQ account system exchanges data with a server. The content included in the entire message can be taken as property information corresponding to the QQ account system. Alternatively, information contained in a segment at a specific location may be selected from among the segments of the message to be the property information. For example, information contained within seventh-tenth bytes, which is a QQ number, is selected as the property information corresponding to the QQ account system. The present disclosure is not construed to using data messages or segments in the date messages that are sent when account systems and servers perform information exchange as property information. Similarly, local data that is generated during an operation of an account system on a login host may be used as property information. For example, QQ software obtains a local system time when QQ is running. The method of login verification disclosed in the present disclosure is based on selecting an account system as an under-protected account system and setting one or more other account systems as related account systems of the under-protected account system, e.g., setting AliPay as an under-protected account system, and QQ as a related account system. Verifying whether a login of the under-protected account system by a user is reliable is performed using property information of the related account system. Details of a process thereof are shown in the following embodiments.

FIG. 2 illustrates a flowchart of a method of login verification in accordance with an embodiment of the present disclosure. A process thereof is applied in a client of login verification, and includes:

Block S201 obtains a login request from a user for logging into an under-protected account system, where the login request includes at least an account to be logged in.

If an account system that is currently under protection is AliPay, a client of login verification that is run on a host obtains a login request of a user when the user logs into an account of AliPay on the host.

Block S202 determines, from property information stored in a current login host, property information of a current related account system that corresponds to the account to be logged in.

Assuming that the related account system corresponds to the account system that is currently under protection is QQ. Current property information of QQ that corresponds to the logged AliPay account is obtained from the property information stored in the current login host. The current property information of QQ that corresponds to the AliPay account may be property information corresponding to all QQ accounts that are stored in the current host, or property information corresponding to QQ accounts which are logged in through the current host within a predetermined time interval.

Block S203 generates login verification information including at least the property information of the current related account system.

Block S204 sends the login verification information to a server.

The property information of the current related account system in the login verification information is a basis for determining that a login is reliable when the server compares the property information of the current related account system with pre-stored reliable property information that corresponds to the account to be logged in and when an intersection therebetween exists and the intersection satisfies a pre-set criterion.

An intersection therebetween means that the reliable property information includes information of the property information of the current related account system, or the property information of the current related account system includes information of the reliable property information.

For example, the reliable property information that corresponds to the account to be logged in and pre-stored in the server may include QQ numbers: A, B and C. If the property information of the current related account system that is sent during the current login includes a QQ number A, an intersection exists therebetween.

A predefined criterion for an intersection may be: the number of related accounts contained in the intersection being not less than a predefined value, e.g., three. This predefined value may be set up based on actual situations. If a scenario of a current application needs a high degree of reliability, the predefined value may be a relatively large value. In other words, the higher the value of the intersection is, the more reliable it will be. If the scenario of the current application does not require a high degree of reliability, the predefined value may be a smaller value. If the number of related accounts contained in the intersection is less than the predefined value, this intersection does not satisfy the criterion, although the intersection exists.

Furthermore, the criterion for the intersection may also be: whether the intersection contains property information of one or more specific related accounts. For example, assume that the QQ number A corresponds to property information of a specific related account. If the reliable property information contains A, B and C and the property information of the current related account contains B and C, and if a determination is made based on this criterion, an intersection therebetween, though it exists, fails to satisfy the pre-set criterion because it does not include the specific related account A.

In the method of login verification disclosed in the present disclosure, the client sends, to the server, the property information of the current related account which is stored in the current login host and corresponds to the account to be logged in that is associated with the under-protected account system, so that the server can compare it with the pre-stored reliable property information that corresponds to the account to be logged in, and when an intersection therebetween exists, determines that this login is reliable. As such, no additional operations of performing login verification using a digital certificate or a U-shield are needed, thus simplifying a login verification process and improving the efficiency of login verification conducted by the server.

Furthermore, the cost for the user is reduced as purchasing a U-shield or a digital certificate is not needed.

Moreover, the process may further include:
performing irreversible processing on the property information of the current related account system.

A specific operation thereof may include applying a hash value operation to the QQ property information to obtain a corresponding hash value.

The process of performing the irreversible processing on the property information of the current related account system can be added prior to sending the login verification information to the server, so as to ensure that the property information will not be maliciously modified during a transmission process, thus ensuring the accuracy of the property information and further improving the accuracy of the verification process.

Figure 3:
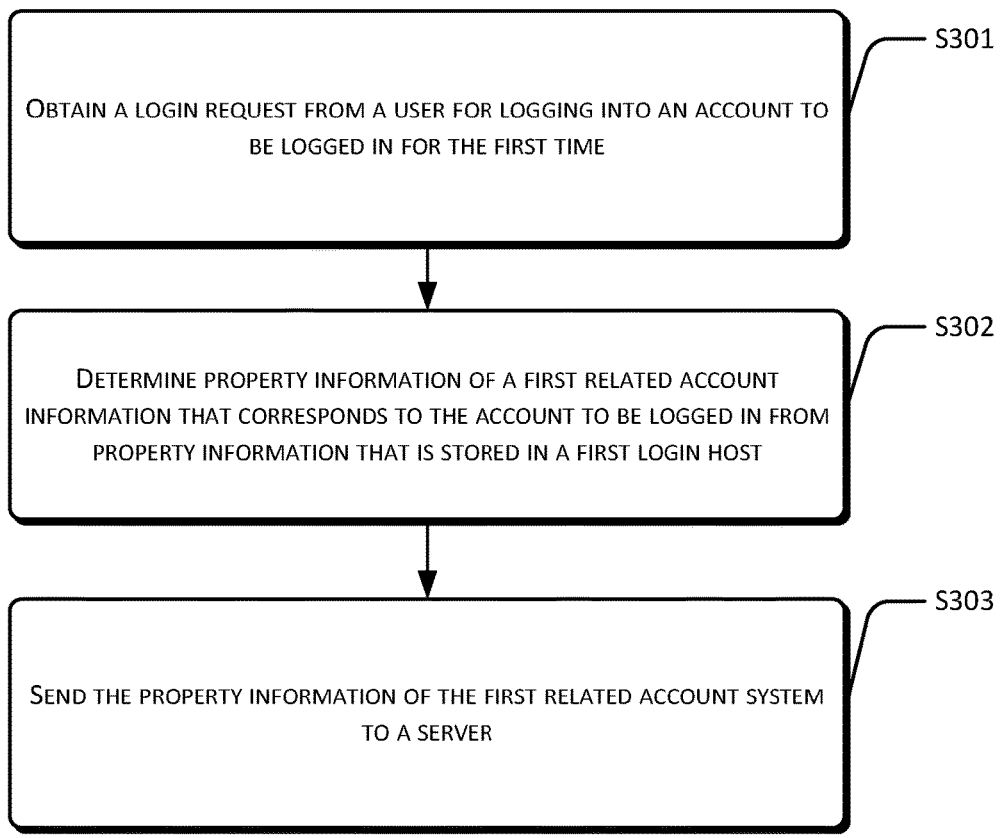
FIG. 3 is a flowchart illustrating a process of creating reliable property information in accordance with an embodiment of the present disclosure.

Furthermore, in the above embodiment, the server pre-stores the reliable property information that corresponds to the account to be logged in. The reliable property information is created using the following blocks. Details of a process thereof are shown in FIG. 3 and include:

Block S301 obtains a login request that a user has sent for logging into an account to be logged in for the first time.

The client obtains a login request when the user registers the account to the logged in for the first time.

Block S302 determines property information of a first related account system corresponding to the account to be logged in from property information stored in a first login host.

If a host that is used by the user for first-time registration stores property information of three QQ numbers, the property information of these three QQ numbers is taken as the property information of the first related account system.

Block S303 sends the property information of the first related account system to a server, where the property information of the first related account system is a basis on which the server determines the reliable property information corresponding to the account to be logged in.

The server stores the property information of the first related account system upon receiving thereof, and may directly use it as the reliable property information of the account to be logged in, or perform other processing on it, such as repeatedly updating it, and use the updated content as the reliable property information of the account to be logged in.

In the present embodiment, the client may be used as a back-end long-running process and a learning device of the property information of the related account. The process fetches the property information of the related account, etc., that is stored in the host and uploads it to the server after irreversible processing. The server stores and maintains the property information, and updates it according to the property information uploaded from the client.

As it is very unlikely to have unreliable login when a user logs in an account for the first time, using property information of a related account which is stored in a host through which the user performs a login for the first time as reliable property information is very reliable and can greatly ensure the accuracy of the verification process.

Moreover, the present embodiment may further include: conducting a process of irreversible operation on the property information of the first related account system.

This process may be added prior to sending the property information of the first related account system to the server, so as to ensure that the property information will not be maliciously modified during a transmission process, thus ensuring the accuracy of the property information and further improving a subsequent process of verification which is conducted based on the property information.

Figure 4:
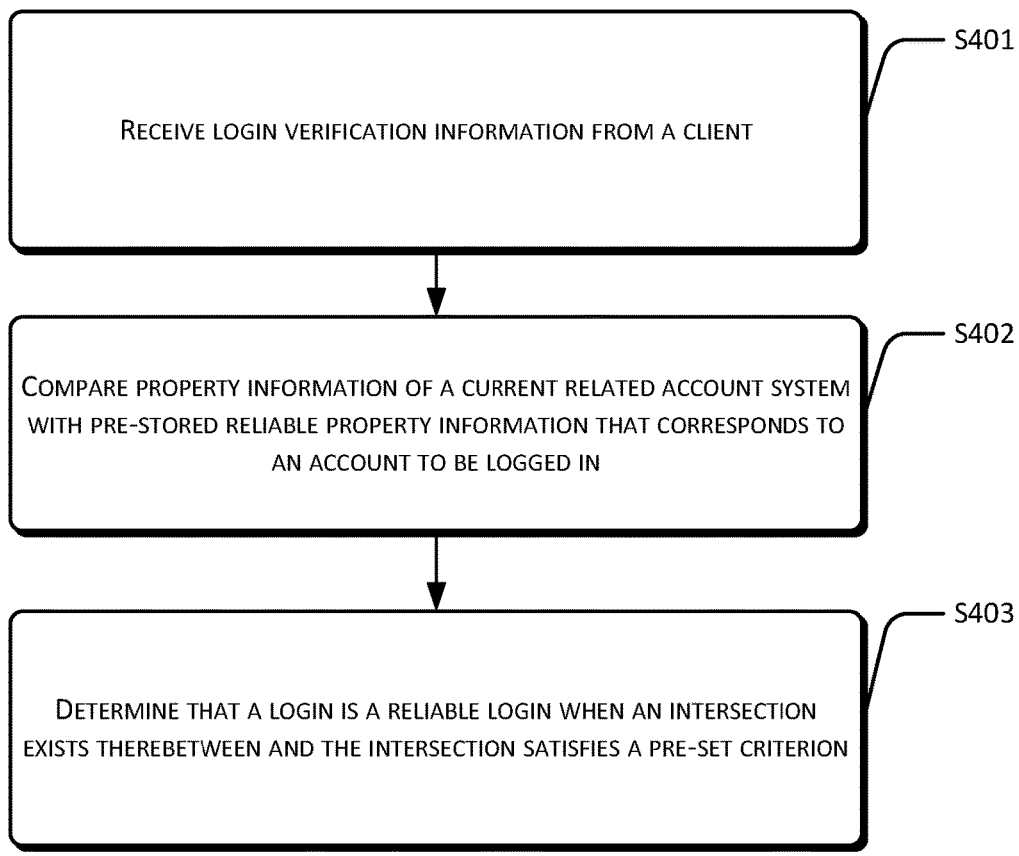
FIG. 4 is a flowchart illustrating another method of login verification in accordance with an embodiment of the present disclosure.

FIG. 4 is a flowchart illustrating another method of login verification disclosed in the present disclosure, which is used in the server of the login verification. Details include:

Block S401 receives login verification information sent from a client.

The login verification information includes at least login verification information of property information of a current related account system corresponding to an account to be logged in. The property information of the current related account system is determined from property information that is stored in a current login host after the client obtains a login request sent by a user.

The property information includes a pre-set message of a network flow corresponding to an account system or a pre-set segment in the pre-set message.

Block S402 compares the property information of the current related account system with pre-stored reliable property information that corresponds to the account to be logged in.

Assume that the property information of the current related account system is QQ numbers A, B, C and D, and the reliable property information is QQ numbers C and D.

Block S403 determines that a login is reliable when an intersection therebetween exists and the intersection satisfies a pre-set criterion.

A common intersection of C and D is found to exist by comparing the two properties. If the pre-set criterion is the number of the related accounts contained in the intersection being not less than two, the intersection therebetween exists and the intersection satisfies the pre-set criterion, proving that this login is a reliable login.

Furthermore, when there is no intersection or the intersection does not satisfy the pre-set criterion, the method further includes: verifying whether the current login host is a trusted host, and if affirmative, determining that the login is reliable, and if not, determining that the login is unreliable.

Specifically, when the login verification information sent from the client to the server includes a machine property of the current login host, the process of verifying whether the current login host is a trusted host includes:

determining whether the machine property of the current login host satisfies a first reliable criterion, and the current login host is trusted if affirmative and not trusted otherwise. The machine property described in the present embodiment may be an ID of the host, a MAC address of the host, a hard disk serial number of the host, a CPU ID of the host, etc.

Figure 5:
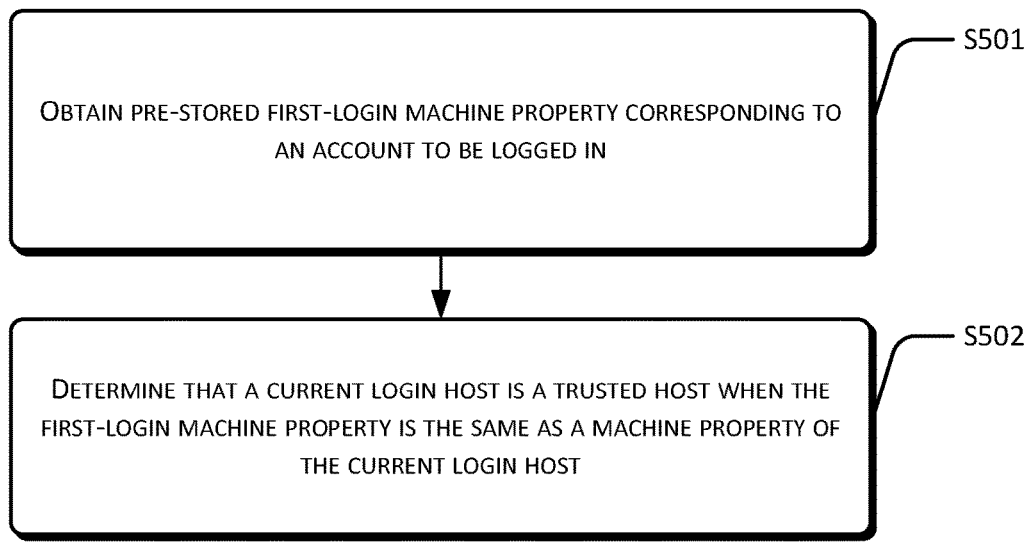
FIG. 5 is a flowchart illustrating determination of whether a machine property of a current login host satisfies a first reliable criterion in accordance with an embodiment of the present disclosure.

A specific implementation of determining whether a machine property of a current login host satisfies a first reliable criterion is illustrated in FIG. 5, which includes:

Block S501 obtains pre-stored machine property associated with a first login corresponding to the account to be logged in.

Block S502 determines that the current login host is reliable when the machine property associated with the first login is the same as the machine property of the current login host.

In other words, the current login host is the host through which the user logs into the account to be logged in for the first time, and thus is a trusted host. The login is also determined as a reliable login.

Figure 6:
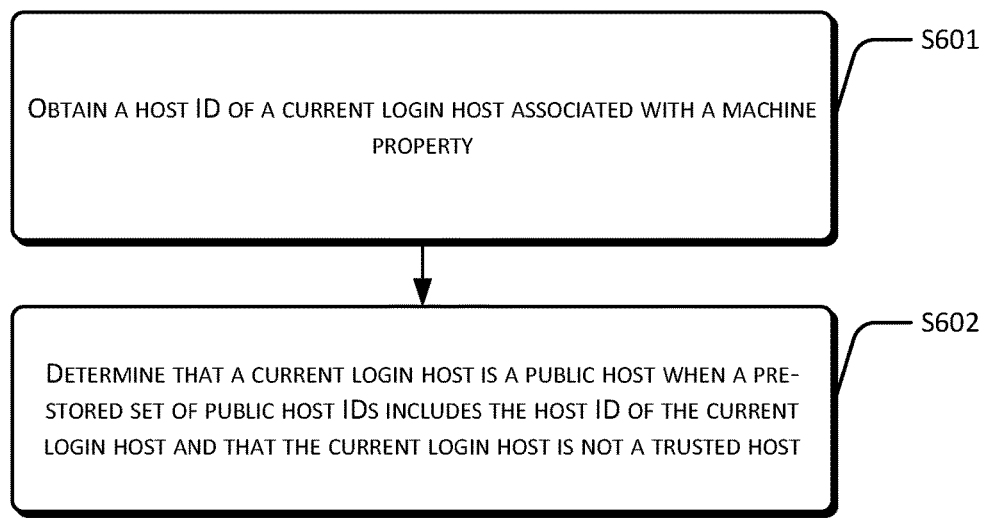
FIG. 6 is a flowchart illustrating another determination of whether a machine property of a current login host satisfies a first reliable criterion in accordance with an embodiment of the present disclosure.

Another implementation process of determining whether a machine property of a current login host satisfies a first reliable criterion is illustrated in FIG. 6, which includes:

Block S601 obtains a host ID of a current login host of the machine property.

Block S602 determines that the current login host is a public host and the current login host is not a trusted host when a pre-stored set of public host IDs contains the host ID of the current login host.

The above process determines whether a current login host is a public host, e.g., a host in an internet cafe or a host in a public computer room. If the current login host is not a public host, the current login host is determined to be a trusted host. If determined to be a public host, the current login host is determined not to be a trusted host.

The process of verifying whether the current login host is a trusted host may also include:

obtaining a historical login record of the current login host; and the current login host being a trusted host when the historical login record satisfies a second reliable criterion.

Figure 7:
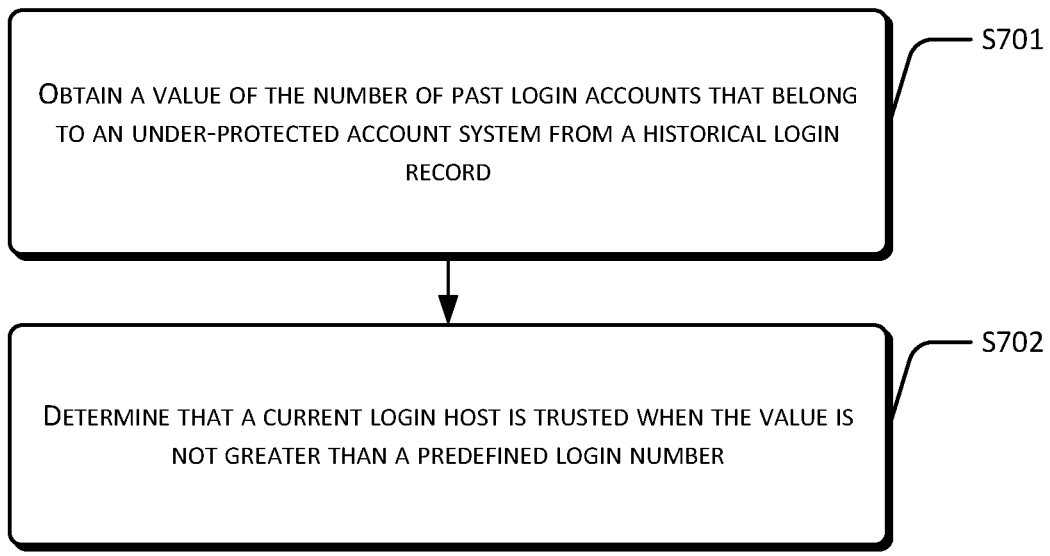
FIG. 7 is a flowchart illustrating determination of whether a historical login record satisfies a second reliable criterion in accordance with an embodiment of the present disclosure.

An implementation process of determining whether a historical login record satisfies a second reliable criterion is illustrated in FIG. 7, which includes:

Block S701 obtains, from the historical login record, a value of the number of past login accounts that belong to the under-protected account system.

Block S702 determines that the current login host is a trusted host when the value is not greater than a predefined login number.

The above process determines whether the current login host is a public host by checking the number of historical login accounts in the historical login data of the current login host. If it is a public host, it is unreliable.

Figure 8:
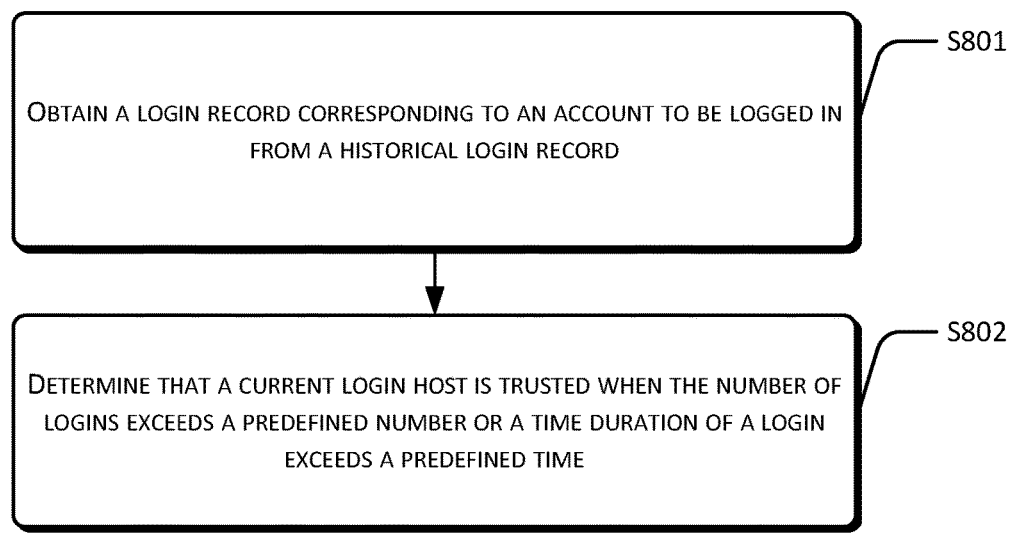
FIG. 8 is a flowchart of illustrating another determination of whether a historical login record satisfies a second reliable criterion in accordance with an embodiment of the present disclosure.

Another implementation process of determining whether a historical login record satisfies a second reliable criterion is illustrated in FIG. 8, which includes:
Block S801 obtains a login record corresponding to the account to be logged in from the historical login record.

Block S802 determines that the current login host is a trusted host when the number of logins exceeds a pre-set number or the time duration associated with a login exceeds a pre-set time.

In the present embodiment, in order to determine whether the host is trustable, a determination is made about whether the user has performed login in that host for multiple times or whether the user has persistently logged in through that host for a period of time. The pre-set number can be an arbitrarily set value such as five or ten times, and the pre-set time can be a time value that is arbitrarily set, such as a week or a month.

Figure 9:
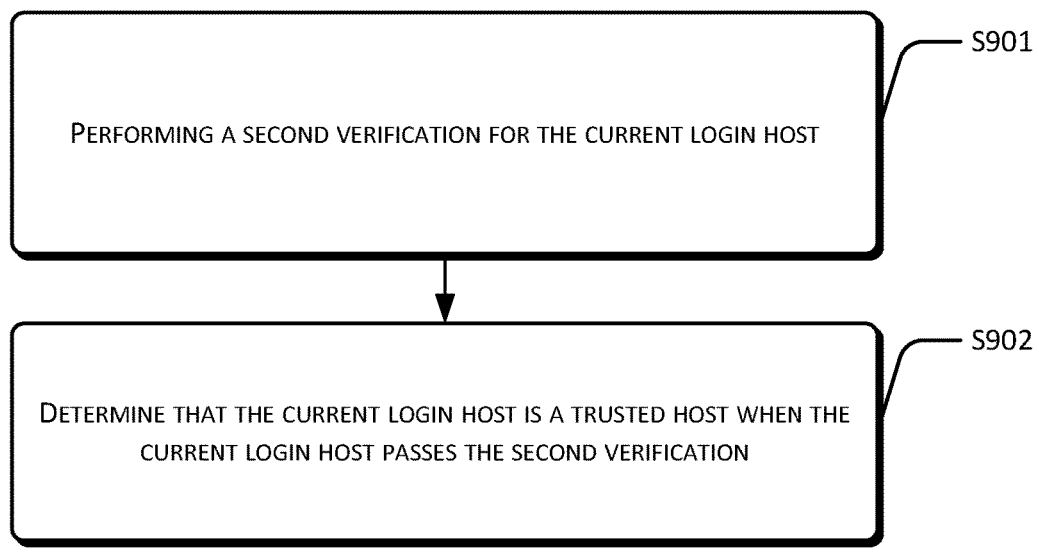
FIG. 9 is a flowchart of illustrating determination whether a host is a trusted host in accordance with an embodiment of the present disclosure.

Furthermore, an alternative process of verifying whether the current login host is a trusted host is shown in FIG. 9, which includes:
Block S901 conducts a second verification for the current login host.

A method of second verification may be implemented in various ways, such as sending a mobile phone verification code, etc, and is not repeatedly described herein.

Block S902: when the current login host passes the second verification, the current login host is a trusted host.

The present embodiment is not limited to the processes shown in FIGS. 5-9 for determining whether a current login host is trusted. Other methods that are capable of verifying whether a current login host is trusted are also within the scope of the present disclosure.

Moreover, the present embodiment is not limited to any single process shown in FIGS. 5-9 for verifying whether a current login host is trusted. Based on an actual scenario, one skilled in the art may combine any determination criteria thereof and perform verification for the host based on the combined criteria, thereby improving the reliability of a verification result.

Figure 10:
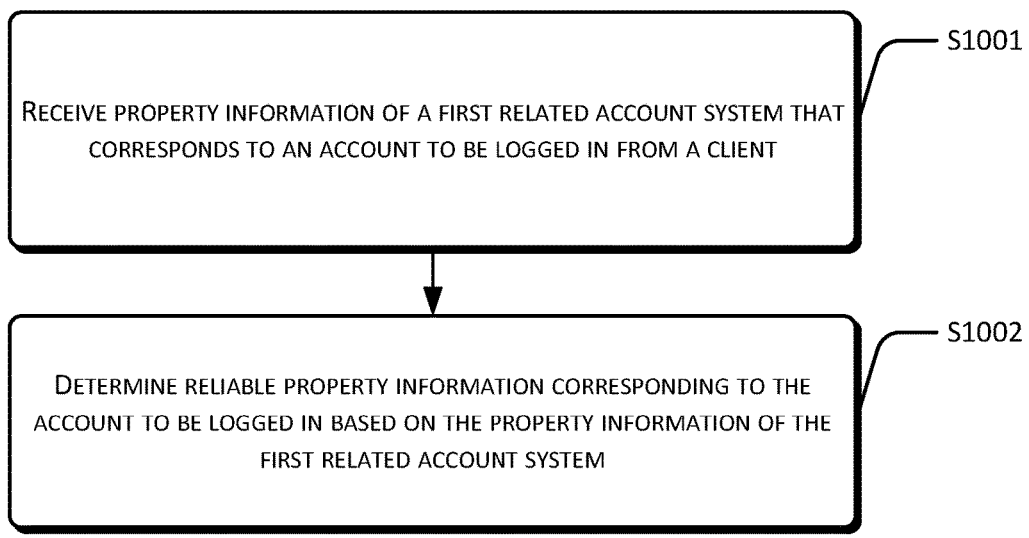
FIG. 10 is a flowchart of obtaining reliable property information in accordance with an embodiment of the present disclosure.

The present disclosure also discloses a process of obtaining reliable property information by a server, which is shown in FIG. 10 and includes:
Block S1001 receives property information of a first related account system that corresponds to an account to be logged in from a client.

The property information of the first related account system is determined from property information that is stored in a first login host when a user logs into the account to be logged in for the first time.

Block S1002 determines reliable property information corresponding to the account to be logged in based on the property information of the first related account system.

In the present embodiment, determining the reliable property information corresponding to the account to be logged in may include storing the property information of the first related account system and using it as the reliable property information of the account to be logged in, or continuously updating the property information of the first related account system and using the updated content as the reliable property information of the account to be logged in.

Details of an update process may include:
After verifying that the current login host is a trusted host and the login is a reliable login, the property information of the current related account system, which has been processed irreversibly, is added to the pre-stored reliable property information that corresponds to the account to be logged in to update the reliable property information corresponding to the account to be logged in.

Assuming that property information of a first related account system of a user is QQ numbers A, B and C, and property information of a current related account system of a current login host is QQ numbers D, E and F, when the login host is a trusted host, the QQ numbers D, E and F are added into reliable property information as updated reliable property information.

Figure 11:
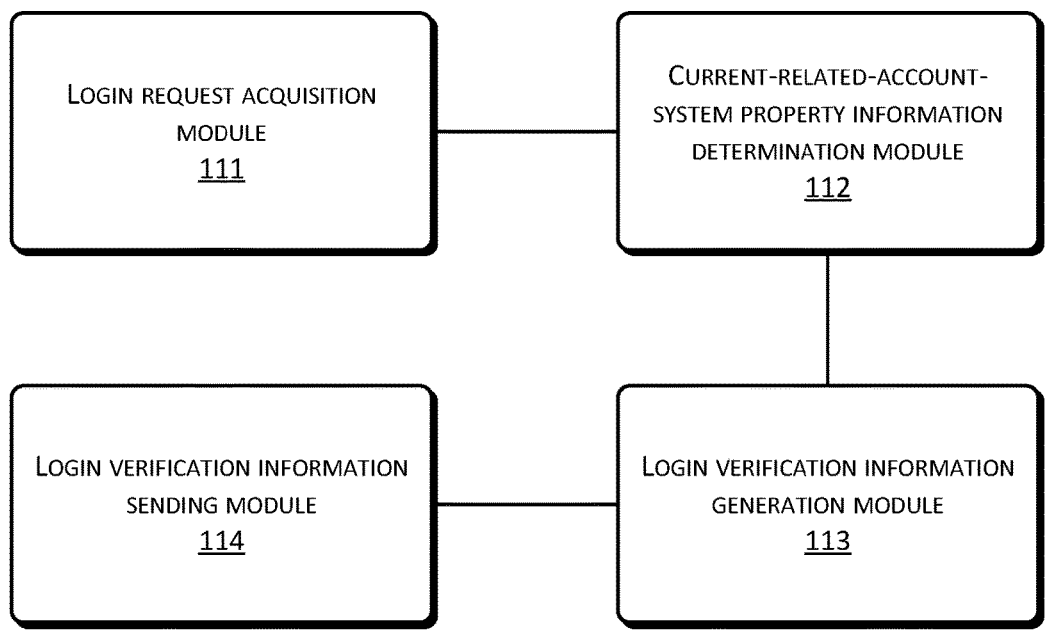
FIG. 11 is a structural diagram of a client of login verification in accordance with an embodiment of the present disclosure.

The present disclosure also discloses a client of login verification which runs on a host. A structure thereof is shown in FIG. 11, which includes:
a login request acquisition module 111, used for obtaining a login request from a user for logging into an under-protected account system, where the login request includes at least an account to be logged in;
a current-related-account-system property information determination module 112, used for determining property information of a current related account system that corresponds to the account to be logged in from property information stored in a current login host;
a login verification information generation module 113, used for generating login verification information including at least the property information of the current related account system that has been irreversibly processed; and
a login verification information sending module 114, used for sending the login verification information to a server, where the property information of the current related account system in the login verification information is a basis for determining that the login is reliable when the server compares the property information of the current related account system with pre-stored reliable property information that corresponds to the account to be logged in and when an intersection therebetween exists and the intersection satisfies a pre-set criterion.

Moreover, the property information of the current related account system may further be processed irreversibly.

Furthermore, the present embodiment is not limited to the work process as described above. The processes shown in FIGS. 2 and 3 may also be referenced to for the details of the work process.

When obtaining a login request that a user logs in an under-protected system, the client of login verification disclosed in this embodiment initiatively obtains property information of a related account of a current login host and sends it to a server as a basis for verifying whether the login is reliable, thus achieving the goals of simplifying the process of login verification and improving the efficiency of login verification by the server.

Figure 12:
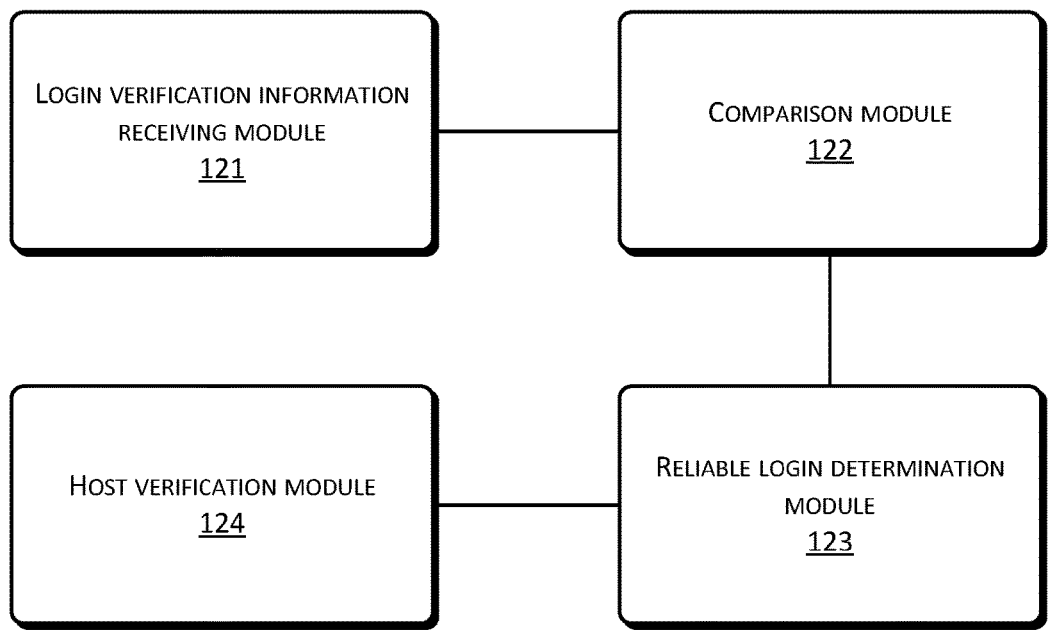
FIG. 12 is a structural diagram of a server of login verification in accordance with an embodiment of the present disclosure.

The present disclosure also discloses a server of login verification. A structure thereof is illustrated in FIG. 12, which includes:
a login verification information receiving module 121, used for receiving login verification information sent from a client, where the login verification information includes at least login verification information of property information of a current related account system that corresponds to an account to be logged in, and where the property information of the current related account system is determined using property information stored in a current login host after the client obtains a login request from a user;
a comparison module 122, used for comparing the property information of the current related account system with pre-stored reliable property information that corresponds to the account to be logged in; and a reliable login determination module 123, used for determining a login is reliable when an intersection exists and the intersection satisfies pre-set criterion.

Moreover, the server further includes a host verification module 124, used for verifying whether the current login host is a trusted host when an intersection does not exist or the intersection does not satisfy the pre-set criterion. If the host is trusted, the login is a reliable login. If the host is not trusted, the login is an unreliable login.

Further, the present embodiment is not limited to the work process as described above. The processes shown in FIGS. 4-10 may also be referenced to for the details of the work process.

The server of login verification disclosed in this embodiment compares property information of a current related account system sent from a client to reliable property information, and determines whether a login is reliable based on whether an intersection exists, thus simplifying the verification process, improving the efficiency of verification and further improving the reliability of the verification.

Figure 13:
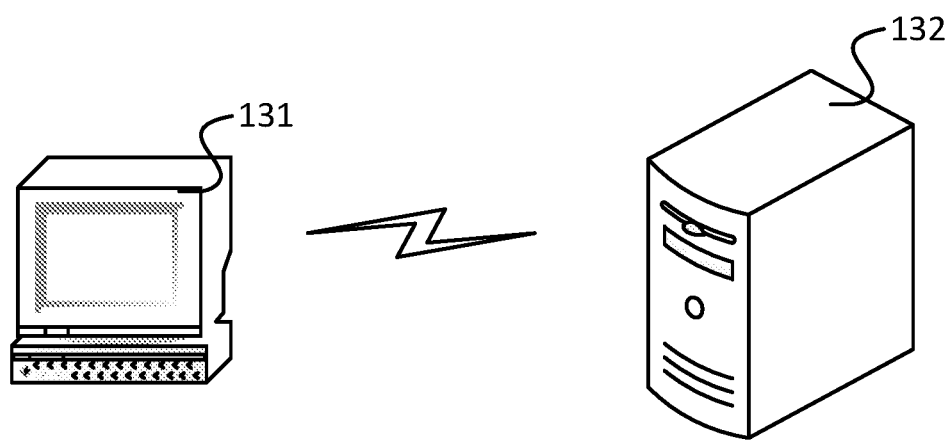
FIG. 13 is a structural diagram of a system of login verification in accordance with an embodiment of the present disclosure.

The present disclosure also discloses a system of login verification. A structure thereof is illustrated in FIG. 13, which includes a client of login verification as shown in FIG. 11 and a server of login verification as shown in FIG. 12. Their work processes are not repeatedly described herein.

The exemplary system of login verification achieves verification of login activity of a user through collaboration of a client of login verification and a server of login verification, thereby simplifying a verification process and improving the efficiency of verification.

Figure 14:
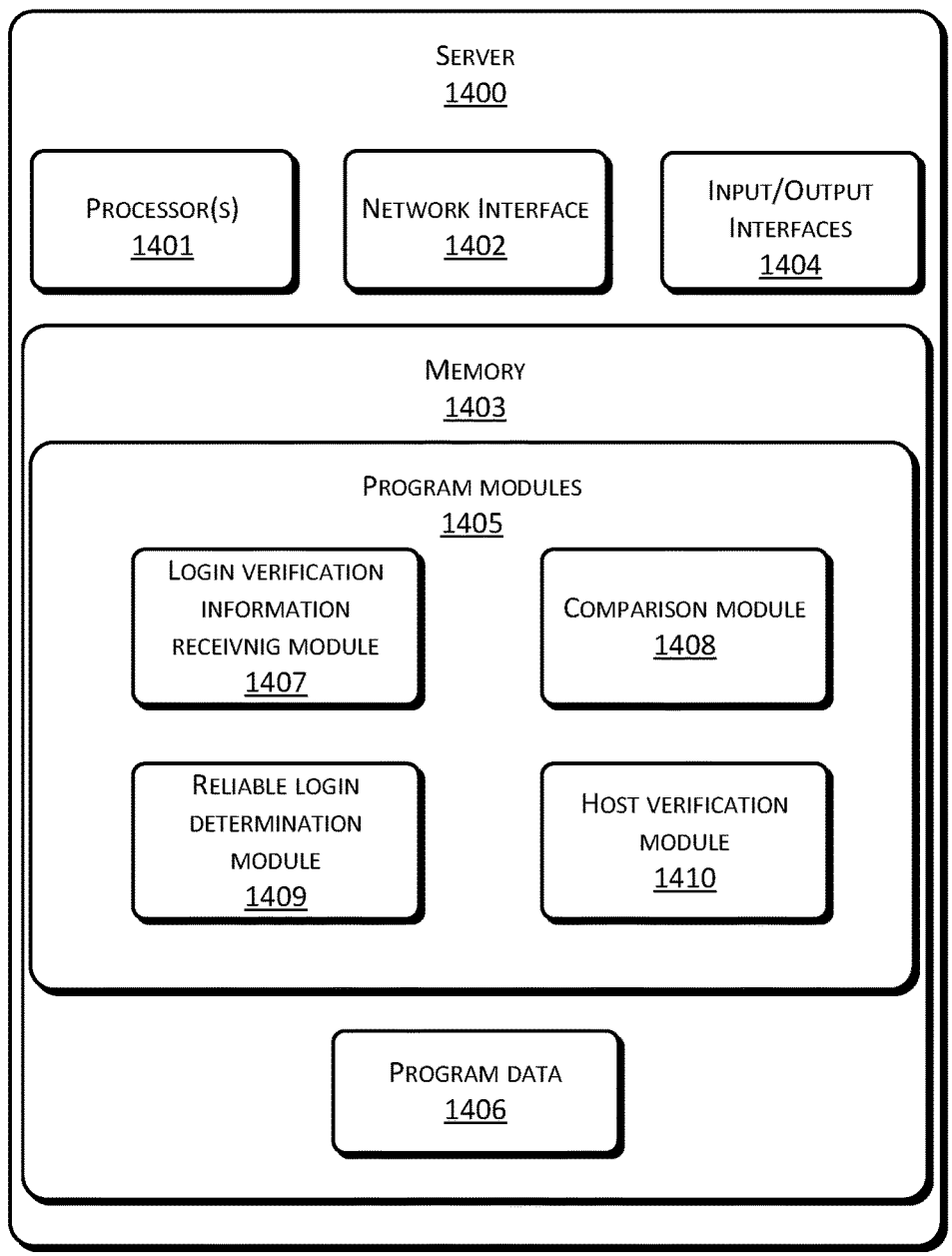
FIG. 14 is a structural diagram of the example server as described in FIG. 12.

FIG. 14 illustrates an example server 1400, such as the server as described above, in more detail. In one embodiment, the server 1400 can include, but is not limited to, one or more processors 1401, a network interface 1402, memory 1403, and an input/output interface 1404.

The memory 1403 may include computer-readable media in the form of volatile memory, such as random-access memory (RAM) and/or non-volatile memory, such as read only memory (ROM) or flash RAM. The memory 803 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 1403 may include program modules 1405 and program data 1406. In one embodiment, the program modules 1405 may include a login verification information receiving module 1407, a comparison module 1408, a reliable login determination module 1409 and a host verification module 1410. Details about these program modules thereof may be found in the foregoing embodiments described above.

It is noted that various exemplary embodiments are progressively described in this disclosure. The main points of each exemplary embodiment may be different from other exemplary embodiments, and same or similar portions of the exemplary embodiments may be referenced with one another. The descriptions of exemplary systems are relatively simple as these exemplary apparatuses are similar to their counterpart embodiments of exemplary methods. Related details can be found in the embodiments of exemplary methods.

Finally, it should be pointed out that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants cover non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

The methods and servers of recognizing user identity have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields. All in all, contents in the present disclosure should not be construed as limitations to the present disclosure.

What is claimed is:

1. A method of login verification, comprising:
   receiving login verification information sent from a client to log into an account, the login verification information including at least property information of a current related account system, the property information of the current related account system being stored at the client, the current related account system being different from the account, and the property information including multiple account identifications of the current related account system;
   comparing the property information of the current related account system with pre-stored reliable property information; and
   determining that a login to the account is reliable when an intersection between the property information of the current related account system and the pre-stored reliable property information exists and the intersection satisfies a pre-set criterion, the pre-set criterion including the intersection between the multiple account identifications of the current related account system included in the property information and one or more account identifications of the current related account system included in the pre-stored reliable property information is more than a preset threshold.

2. The method as recited in claim 1, wherein, when no intersection exists or the intersection does not satisfy the pre-set criterion, the method further comprises:
   verifying whether the current login host is a trusted host; and in response to determining that the current login host is the trusted host, determining that the login is reliable; or in response to determining that the current login host is not the trusted host, determining that the login is unreliable.

3. The method as recited in claim 2, wherein, when the login verification information comprises a machine property of the current login host, the verifying whether the current login host is a trusted host comprises:

determining that the current login host is the trusted host when the machine feature of the current login host satisfies a first reliable criterion.

4. The method as recited in claim 2, wherein the verifying whether the current login host is the trusted host comprises:

obtaining a historical login record of the current login host; and determining that the current login host is the trusted host when the historical login record satisfies a second reliable criterion.

5. The method as recited in claim 2, wherein the verifying whether the current login host is the trusted host comprises:

performing a second verification for the current login host; and determining that the current login host is the trusted host when the current login host passes the second verification.

6. The method as recited in claim 2, wherein the pre-stored reliable property information is obtained by the following:

receiving property information of a first related account system corresponding to the account to be logged in from the client, wherein the property information of the first related account system is determined from property information stored in a first login host through which the user logs into the account to be logged in for the first time; and determining reliable property information corresponding to the account to be logged in based on the property information of the first related account system.

7. The method as recited in claim 6, wherein after verifying that the current login host is the trusted host and determining that the login is reliable, the method further comprises:

adding the property information of the current related account system to the pre-stored reliable property information corresponding to the account to be logged in to update the reliable property information corresponding to the account to be logged in.

8. The method as recited in claim 1, wherein the client is a current login host.

9. The method as recited in claim 8, wherein the property information further includes data that is generated during an operation of the second account system at the current login host.

10. The method as recited in claim 8, further comprising verifying that the current login host is a trusted host in response to determining that there are multiple logins at the current login host during a preset period of time.

11. One or more computer-readable media storing executable instructions that, when executed by one or more processors, cause the one or more processors to perform acts comprising:

receiving login verification information sent from a client to log into an account, the login verification information including at least property information of a current related account system, the property information of the current related account system being stored at the client, the current related account system being different from the account, and the property information including a data message exchanged between the current related account system and a server corresponding to the current related account system or a pre-set segment of the data message;

comparing the property information of the current related account system with pre-stored reliable property information corresponding to the account to be logged in; and determining that a login to the account is reliable when an intersection exists and the intersection satisfies a pre-set criterion.

12. The one or more computer-readable media as recited in claim 11, wherein, when no intersection exists or the intersection does not satisfies the pre-set criterion, the acts further comprise:

verifying whether the current login host is a trusted host; and in response to determining that the current login host is the trusted host, determining that the login is reliable; or in response to determining that the current login host is not the trusted host, determining that the login is unreliable.

13. The one or more computer-readable media as recited in claim 12, wherein, when the login verification information comprises a machine property of the current login host, the verifying whether the current login host is the trusted host comprises:

determining that the current login host is the trusted host when the machine feature of the current login host satisfies a first reliable criterion.

14. The one or more computer-readable media as recited in claim 12, wherein the verifying whether the current login host is the trusted host comprises:

obtaining a historical login record of the current login host; and determining that the current login host is the trusted host when the historical login record satisfies a second reliable criterion.

15. The one or more computer-readable media as recited in claim 12, wherein the verifying whether the current login host is the trusted host comprises:

performing a second verification for the current login host; and determining that the current login host is the trusted host when the current login host passes the second verification.

16. The one or more computer-readable media as recited in claim 12, wherein the pre-stored reliable property information is obtained by the following:

receiving property information of a first related account system corresponding to the account to be logged in from the client, wherein the property information of the first related account system is determined from property information stored in a first login host through which the user logs into the account to be logged in for the first time; and determining reliable property information corresponding to the account to be logged in based on the property information of the first related account system.

17. The one or more computer-readable media as recited in claim 16, wherein after verifying that the current login host is the trusted host and determining that the login is reliable, the method further comprises:

adding the property information of the current related account system to the pre-stored reliable property information corresponding to the account to be logged in to update the reliable property information corresponding to the account to be logged in.

18. The one or more computer-readable media as recited in claim 11, wherein the client is a current login host.

19. The one or more computer-readable media as recited in claim 11, wherein the acts further comprise verifying that the current login host is a trusted host in response to determining that there are multiple logins at the current login host during a preset period of time.

20. A server comprising:
one or more computer processors; and
one or more computer-readable media storing executable instructions that, when executed by one or more computer processors, cause the one or more computer processors to perform acts including:
receiving, from a client that is a current login host, a login request for logging into an account of a first account system, the login request including a request for logging into the account of the first account system and login verification information, the login verification information including property information of a second account system that is designated as a related account system of the first account system, the first account system and the second account system being associated with different applications, the property information including data that is generated during an operation of the second account system at the current login host, the data including a system time at the current login host when the operation of the second account system occurs;
verifying that the current login host is a trusted host in response to determining that there are multiple logins at the current login host during a preset period of time;
comparing, by at least one computing device of the one or more computing devices, the property information of the second account system with pre-stored reliable property information corresponding to the account of the first account system; and
determining that a login corresponding to the login request is reliable when an intersection exists between the property information and the pre-stored reliable property information and the intersection satisfies a pre-set criterion.

* * * * *